United States Patent
Roh

(10) Patent No.: US 7,027,494 B2
(45) Date of Patent: Apr. 11, 2006

(54) METHOD FOR GENERATING ORTHOGONAL SPREAD CODES IN MOBILE COMMUNICATION SYSTEM

(75) Inventor: Dong-Wook Roh, Seoul (KR)

(73) Assignee: LG Electronics Inc., Seoul (KR)

( * ) Notice: Subject to any disclaimer, the term of this patent is extended or adjusted under 35 U.S.C. 154(b) by 868 days.

(21) Appl. No.: 09/994,926

(22) Filed: Nov. 28, 2001

(65) Prior Publication Data

US 2002/0105902 A1 Aug. 8, 2002

(30) Foreign Application Priority Data

Nov. 29, 2000 (KR) .............................. 2000-71562

(51) Int. Cl.
*H04B 1/69* (2006.01)

(52) U.S. Cl. ...................... 375/150; 375/346; 375/340; 375/222; 370/342; 370/208; 370/209; 702/189

(58) Field of Classification Search ................ 375/150, 375/346, 222, 340; 370/342, 208, 209; 702/189
See application file for complete search history.

(56) References Cited

U.S. PATENT DOCUMENTS

| | | | | |
|---|---|---|---|---|
| 6,134,215 A | * | 10/2000 | Agrawal et al. | 370/209 |
| 6,646,979 B1 | * | 11/2003 | Chen et al. | 370/208 |
| 6,735,264 B1 | * | 5/2004 | Miller | 375/340 |
| 6,888,813 B1 | * | 5/2005 | Kishi | 370/342 |
| 2002/0009132 A1 | * | 1/2002 | Miller | 375/222 |
| 2004/0017867 A1 | * | 1/2004 | Thomas et al. | 375/346 |
| 2004/0030534 A1 | * | 2/2004 | Thomas et al. | 702/189 |

* cited by examiner

*Primary Examiner*—Shuwang Liu
*Assistant Examiner*—Sudhanshu C. Pathak
(74) *Attorney, Agent, or Firm*—Fleshner & Kim, LLP

(57) ABSTRACT

An orthogonal spread code for a mobile communication system is provided which increases an interference free window (IFW) interval as well as the element number of the orthogonal code set. A large synchronization (LS) code is generated by using an initial 2×2 matrix to generate magnified first and second square matrices. A third square matrix is then generated based on the first and second square matrices, and a code sequence is generated from the rows or columns of the third square matrix. In this manner, the inversely proportional relationship between the element number of the orthogonal code set and the IFW interval may be established, and used to avoid channel prediction errors and reduce power imbalance.

22 Claims, 9 Drawing Sheets

FIG. 1A

LS Code(Length=16)

```
0  : ++-- ++-- , +--+ ----
1  : +++- --+- , +-++ -+++
2  : ++-+ ++-- , +--- +-++
3  : ++-+ ---+ , +--- -+--
4  : +-++ +--- , -+-+ ++-+
5  : +-++ -+++ , +++- --+-
6  : +--- +-++ , ++-+ +++-
7  : +--- -+-- , ++-+ ---+
8  : +++- ++-+ , -+-- -+++
9  : +++- --+- , -+-- +---
10 : ++-+ ++-- , -+++ -+--
11 : ++-+ ---+ , -+++ +-++
12 : +-++ +--- , ---+ --+-
13 : +-++ -+++ , ---+ ++-+
14 : +--- +-++ , --+- ----
15 : +--- -+-- , --+- +++-
```

LS Code(Length=32)

LS Code(Length=128)

METHOD FOR GENERATING ORTHOGONAL SPREAD CODES IN MOBILE COMMUNICATION SYSTEM

BACKGROUND OF THE INVENTION

1. Field of the Invention

The present invention relates to an orthogonal spread code of a CDMA mobile communication system, and more particularly, to a method for generating an LS code via extension of the initial matrix based upon certain rules.

2. Description of the Related Art

In general, a Code Division Multiple Access (CDMA) mobile communication system adopts a spread spectrum communication method which uses a spread code with a transmission bandwidth which is much wider than that of an information signal to be transmitted. The spread spectrum communication method uses a wide frequency bandwidth, and thus can regenerate an original signal via after despreading which increases the signal power and keeps the noise power low. According to a basic principle of the spread spectrum communication method, when a transmitting block modulates a data multiplied by a spread code to widen the bandwidth of a frequency and then transmits a signal, a receiving block multiplies the signal by the same spread code used in the transmitting block to narrow the bandwidth of the frequency and then demodulates the signal to detect the original signal. In general, the signal received through an antenna of the receiving block includes several kinds of noises mixed thereto in addition to the original signal. However, using the spread spectrum communication method converts the several kinds of noises into very weak electric power via despreading process because the original signal is changed into a narrow bandwidth while the several kinds of noises are initially multiplied by the spread code to widen the bandwidth and remarkably reduce the interference of the noises when the receiving block multiplies the spread code for despreading.

The spread code used in such spreading and despreading processes can be used for spreading, synchronization and base station discrimination. In other words, autocorrelation and crosscorrelation processes can be executed for spreading, synchronization and base station discrimination. For detection of a desired signal, autocorrelation characteristics are required to have the maximum value when there are no time-offsets and a smaller value when time-offset values are not zero. Also, the crosscorrelation characteristics are required to have small values at all of the time-offsets for discrimination against a spread code used by a user.

In order to meet the foregoing autocorrelation and crosscorrelation characteristics, a conventional CDMA method uses a Pseudo Noise (PN) code together with a Walsh code as spread codes. The PN code satisfies required characteristics in autocorrelation, and the Walsh code satisfies required characteristics in crosscorrelation.

According to the required characteristics in the foregoing crosscorrelation, no mutual interferences exist among spread codes allocated to a number of users having one channel path but the interferences exist among the spread codes having a number of channel paths. To be more specific, the interferences are as follows:

With one channel path, the amount of mutual interference among the spread codes is determined only by the value of crosscorrelation having no time-offsets. On the contrary, with several channel paths, the amount of crosscorrelation among the spread codes is influenced not only by the crosscorrelation value having no time-offsets but also by the crosscorrelation values which have path delay times among separate channel paths as the time-offsets.

Therefore, in a multi-path channel environment having a number of channel paths which can be a real channel environment, the crosscorrelation characteristics among the spread codes have no time-offsets and the crosscorrelation values in other time-offsets become important as well.

As a result, ideally the crosscorrelation values of the spread codes are required to be 0 at all of the time-offsets. However, it is not known so far about those codes for satisfying the crosscorrelation characteristics and the autocorrelation characteristics at the same time. In other words, referring to the PN and Walsh codes in use for the conventional CDMA method, the PN codes satisfy the required characteristics of autocorrelation while failing to satisfy the required characteristics of crosscorrelation. Also, the Walsh codes fail to meet the required characteristics of autocorrelation while only partially meeting the required characteristics of crosscorrelation. So, referring to the crosscorrelation characteristics of the Walsh codes, the crosscorrelation value is 0 when the time-offsets do not exist, but is not 0 when the time-offsets are not 0.

To solve such drawbacks, one of the orthogonal codes is proposed. The code is called Large Synchronization (LS) code. The LS codes perfectly meet the autocorrelation and crosscorrelation characteristics in a certain time-offset interval. The time-offset interval for perfectly meeting the autocorrelation and crosscorrelation characteristics will be defined as an Interference Free Window (IFW).

Referring to autocorrelation characteristics in the IFW, the autocorrelation value is the maximum where no time-offsets exist, and 0 at any time-offsets in the IFW where the time-offsets are not 0. Also, according to the crosscorrelation characteristics of the LS codes, the crosscorrelation value is 0 at any time-offsets in the IFW.

As a result, in the multi-path channel environment, the interference among the spread codes allocated to users can be eliminated if the path delay time-offsets exist among the channel paths in the IFW. Therefore, the time-offset interval satisfying the foregoing autocorrelation and crosscorrelation characteristics is referred to as the Interference Free Window or IFW.

Referring the autocorrelation characteristics in the IFW, the autocorrelation value is the maximum where no time-offsets exist, and 0 at any time-offsets in the IFW where the time-offsets are not 0. In other words, when the time-offsets are restricted to the IFW interval, the autocorrelation value is the maximum when the time-offsets are 0, and 0 when the time-offsets are not 0.

However, the LS codes are known only by resultants thereof (refer to FIGS. 1A to 1F) whereas a method of generating the resultants is not known up to the present.

Meanwhile, the LS codes satisfy the autocorrelation and crosscorrelation characteristics at any time-offsets in the IFW interval.

However, the LS codes have the autocorrelation and crosscorrelation characteristics excellent in the IFW, whereas there is a disadvantage that the number of codes, which are available in use, is small thereby decreasing increase of channel capacity.

In general, referring to a set of the LS codes satisfying the autocorrelation and crosscorrelation characteristics as an orthogonal code set, a reverse proportional relation is established between the length of the IFW interval and the number of the orthogonal code set. Therefore, in the LS codes, the element number of the orthogonal code set decreases as the IFW interval increases, and on the contrary, the IFW interval decreases as the element number of the orthogonal code set increases. Therefore, a novel orthogonal spread code generating method is in request for solving the disadvantages of the LS codes thereby enabling increase of the IFW interval as well as the element number of the orthogonal code set at the same time. In convenience, a novel orthogonal spread code is called Quasi-LS (QLS) code hereafter.

SUMMARY OF THE INVENTION

Accordingly, the present invention has been devised to solve the foregoing problems and it is an object of the invention to provide a method of generating LS codes, which are known by only resultant codes, by using the initial matrix.

It is another object of the invention to provide a novel orthogonal spread code generating method for compensating a disadvantage of LS codes that elements of an orthogonal code set and an IFW interval exist in a reverse proportional relation.

According to an aspect of the invention to obtain the foregoing objects, it is provided a method for generating orthogonal spread codes in a mobile communication system comprising: generating a first square matrix having a size of powers of 2 by operating an initial 2×2 matrix, generating a second square matrix of same size of the first square matrix by operating the first square matrix, composing a third square matrix of double size of the first square matrix by arranging the first square matrix as a second quarter matrix and a third quarter matrix of the third square matrix, arranging the second square matrix as a first quarter matrix of the third square matrix, and arranging the second square matrix as a fourth quarter matrix of the third square matrix by multiplying all elements thereof with −1, making a deformed matrix by inserting a zero vector between a column or a row of the third square matrix and generating orthogonal spread codes for channel discrimination from the rows or columns of the deformed matrix.

According to the method, the first quarter matrix can be arranged in the upper right of the third square matrix, the second quarter matrix in the upper left of the third square matrix, the third quarter matrix in the lower left of the third square matrix, and the fourth quarter matrix in the lower right of the third square matrix.

According to the method, the first row of the initial matrix is arranged in the left and the second row thereof is arranged in the right to generate the first row of the first 4×4 square matrix, and the first row of the initial matrix can be arranged in the left and the second row can be applied with the opposite symbol and arranged in the right to generate the second row of the first 4×4 square matrix. Also, the first row of the initial matrix can be arranged in the right and the second row thereof is arranged in the left to generate the third row of the first 4×4 square matrix, and the first row of the initial matrix can be applied with the opposite sign and arranged in the right and the second row thereof can be arranged in the left to generate the fourth row of the first 4×4 square matrix.

According to the orthogonal spread code generating method, the second square matrix can be generated by recursively shifting the rows in the first square matrix as half of the matrix size.

According to another aspect of the invention, it is provided a method for generating orthogonal spread codes in a mobile communication system comprising operating an initial square matrix having a size of powers of 2 to generate a first square matrix two times larger than the initial square matrix, operating the first square matrix to generate a second square matrix, arranging the first square matrix as a second quarter matrix and a third quarter matrix, arranging the second square matrix as a first quarter matrix, and arranging the second square matrix as a fourth quarter matrix by multiplying all elements thereof with −1 to generate a third square matrix, inserting a zero vector certain row or column of the third square matrix to compose a deformed matrix and generating orthogonal spread codes for channel discrimination from the rows or columns of the composed matrix.

According to the method, the initial square matrix having the size of powers of 2 can use a quarter matrix of the third square matrix in the previous step having a size that is half of the third square matrix to be obtained.

According to the orthogonal spread code generating method, the odd rows and the even rows of the initial square matrix can be arranged as first and second rows to generate four rows of the first square matrix.

According to other aspect of the invention, it is provided a method for generating orthogonal spread codes in a mobile communication system comprising: operating an initial 2×2 matrix to generate a first square matrix having a size of powers of 2, arranging the first square matrix as a second quarter matrix and a third quarter matrix, operating the first square matrix to generate a second square matrix, arranging the second square matrix as a first quarter matrix and applying a minus symbol to all elements of the second square matrix to generate a fourth quarter matrix, composing a third square matrix by taking the first to fourth quarter matrices as quarter matrices of the third square matrix, inserting zero column vectors among certain columns of the third square matrix to compose a target matrix and taking rows of the target matrix to generate orthogonal spread codes for channel discrimination.

BRIEF DESCRIPTION OF THE DRAWINGS

Figure 1B:
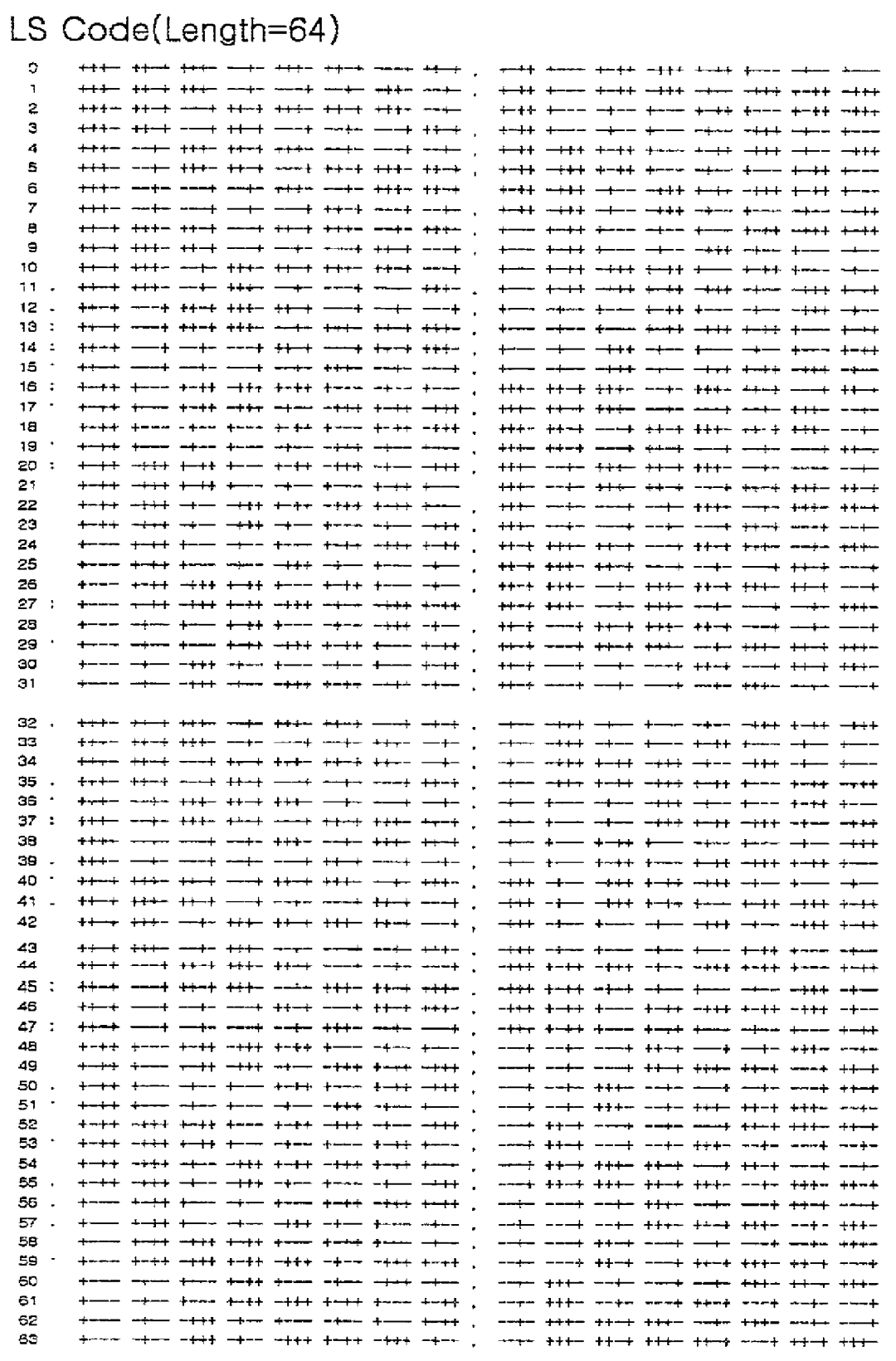
Figure 1C:
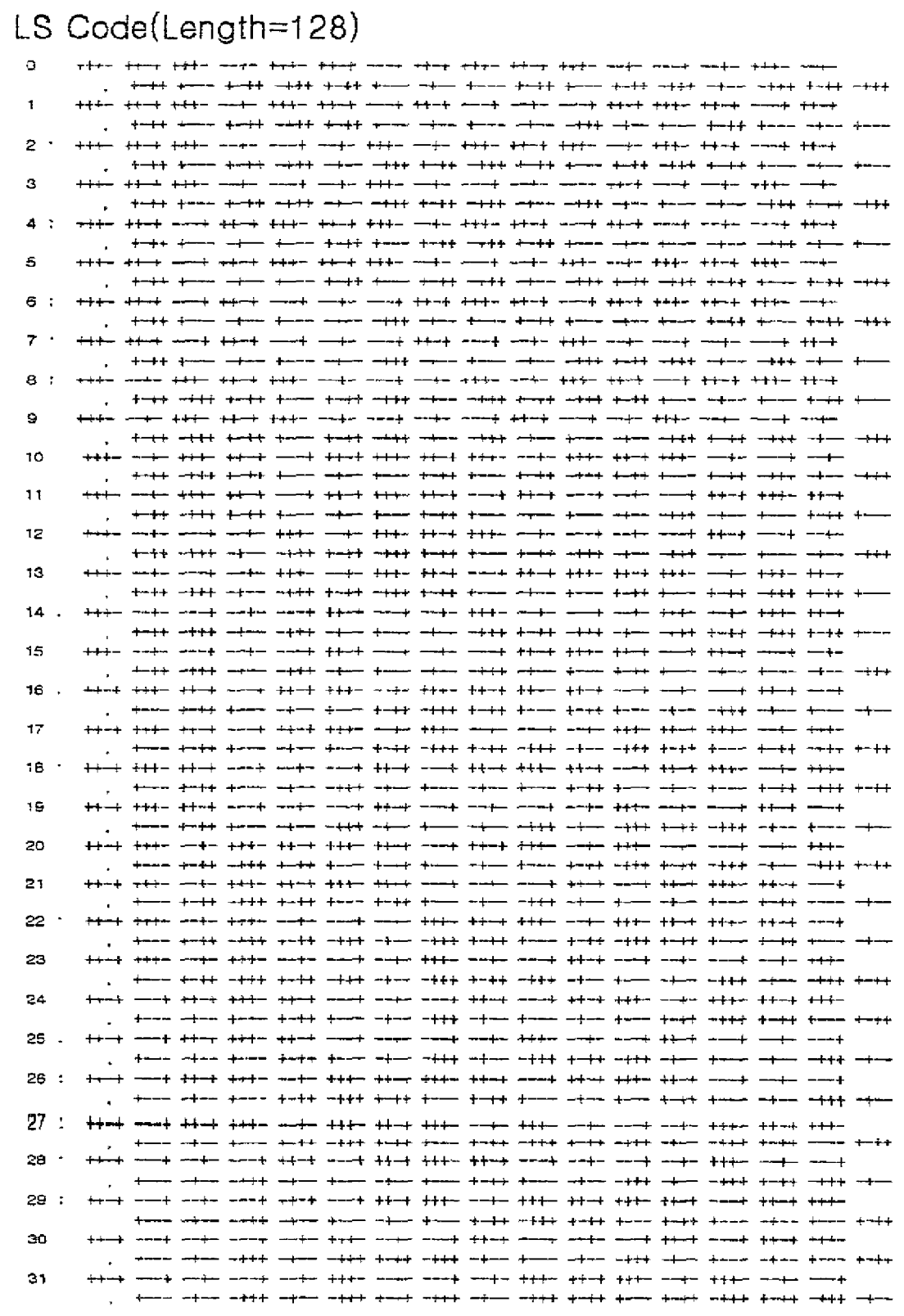
Figure 1D:
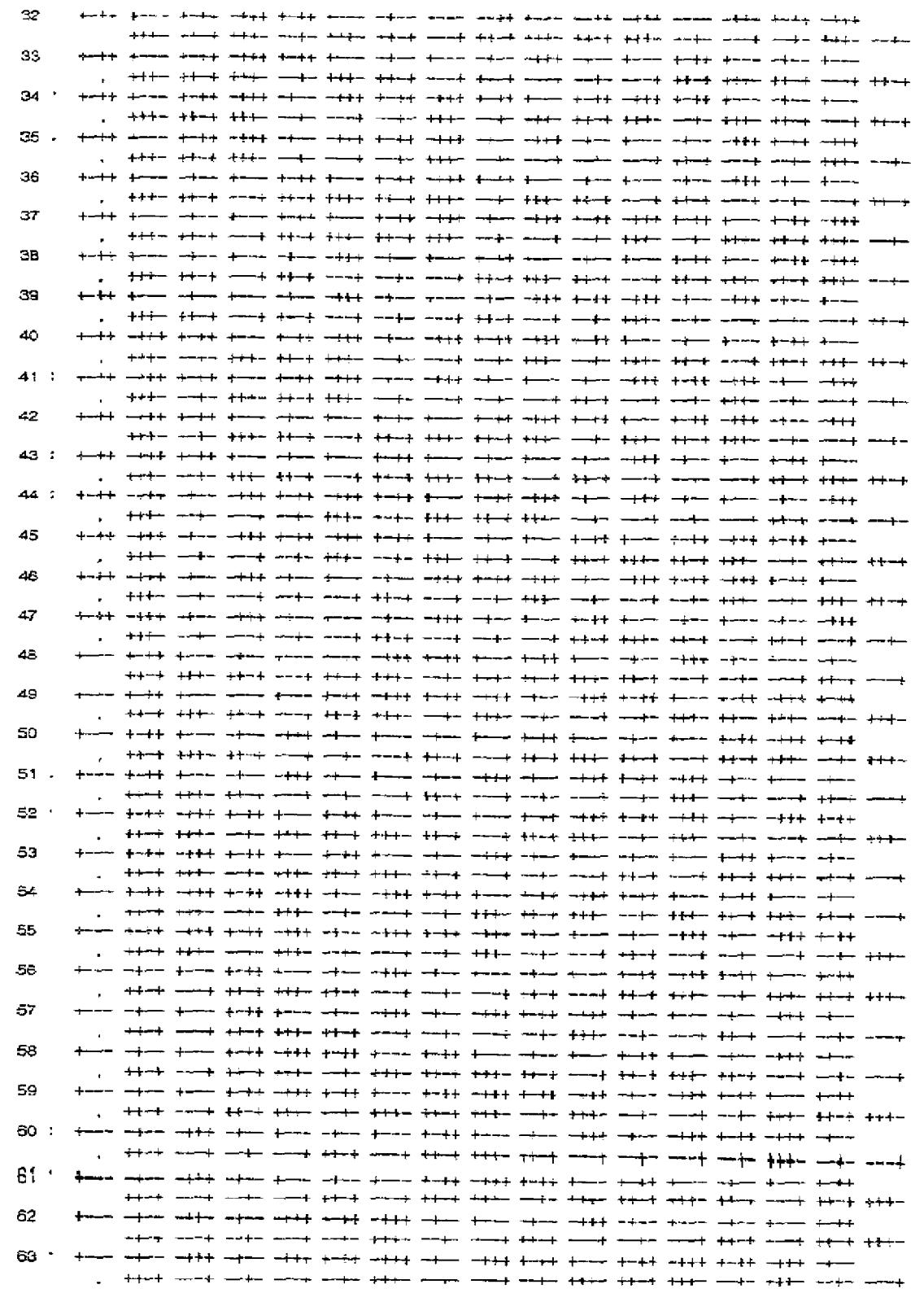
Figure 1E:
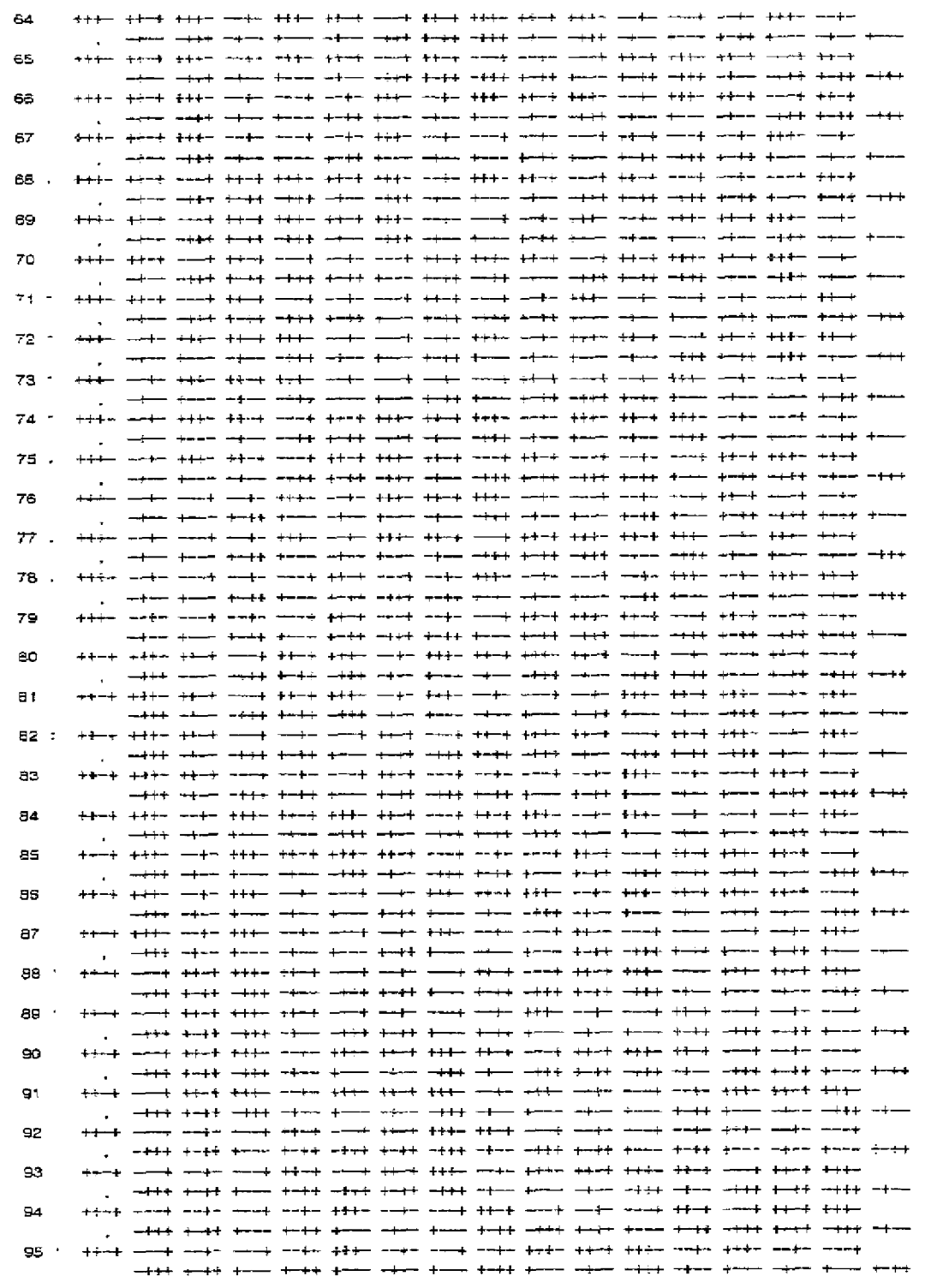
Figure 1F:
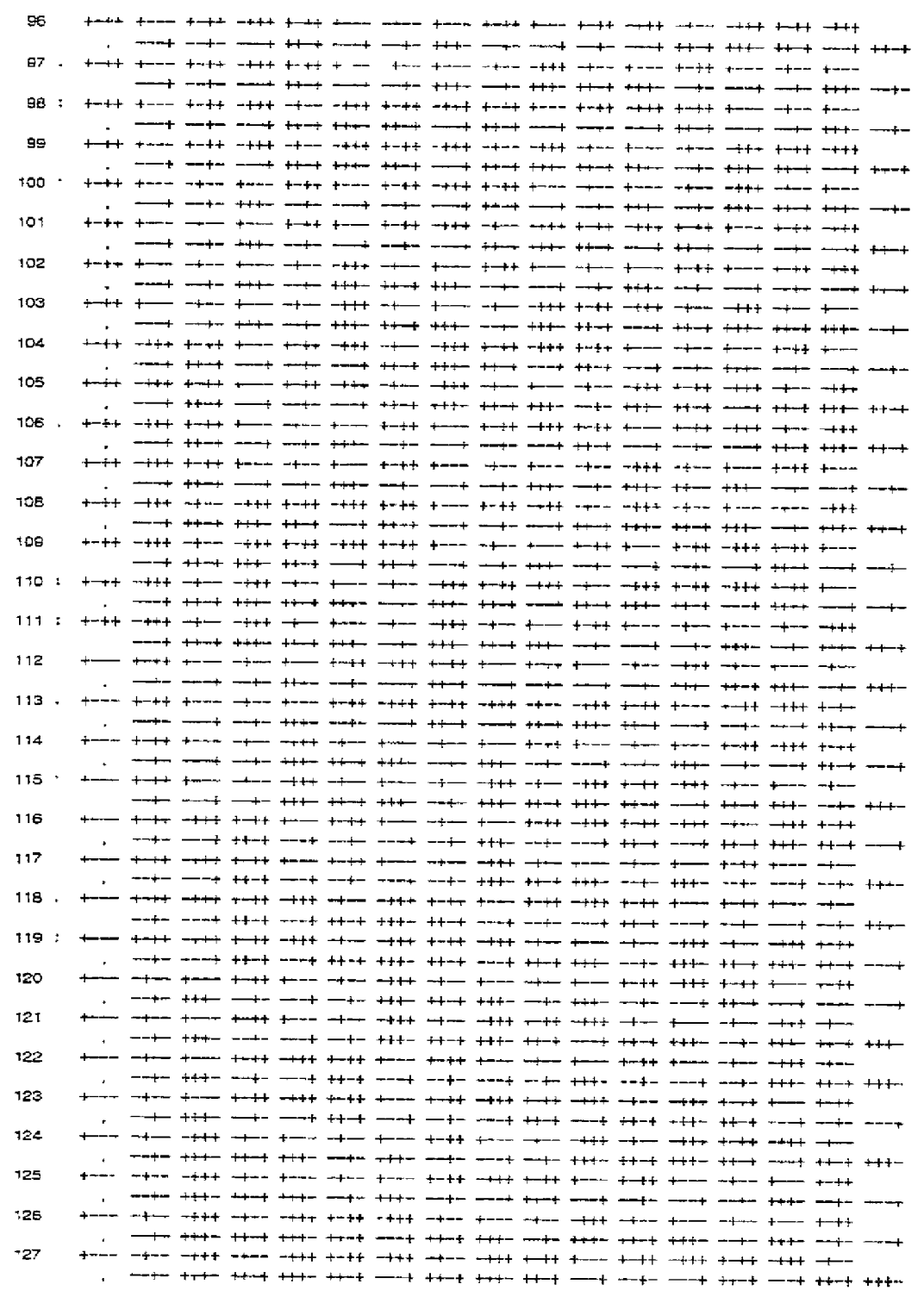

FIGS. 1A to 1F show LS codes with lengths of 16, 32, 64 and 128 which are generated according to a code generating method of the invention;

DETAILED DESCRIPTION OF THE PREFERRED EMBODIMENT

Figure 2:
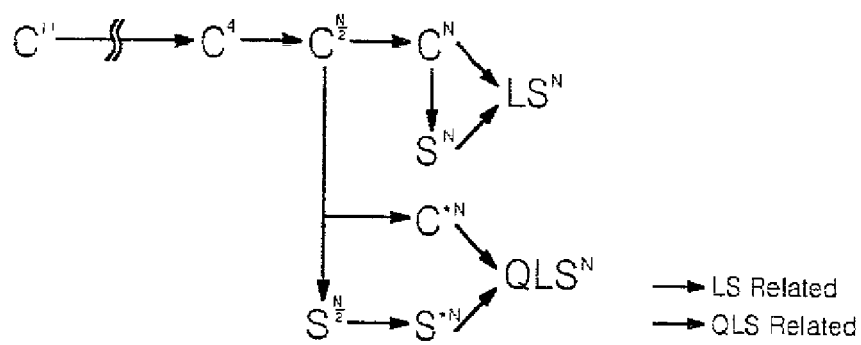
FIG. 2 schematically shows an LS and QLS code generating procedure using an initial matrix.

The following Detailed Description will present an orthogonal spread code generating method of the invention in reference to the accompanying drawings.

FIGS. 1A to 1F show resultant LS codes respectively having lengths of 16, 32, 64 and 128 according to the code generating method of the invention. As mentioned above, a general method of generating the LS codes is not known so far, but it is known only about the resultant LS codes respectively corresponding to the code lengths of 16, 32,64and 128.

In the resultant LS codes, the numbers at the left designate corresponding code numbers, and the + and − symbols correspond to +1 and −1, respectively. Also, the LS codes are divided into C and S components. The C and S components shown in each line of FIGS. 1A to 1F are separated by a comma, and the components to the left of the comma are the C components, while the components to the right of the comma are the S components. The C components are divided into the first C components in the first half of the code, at its upper part, and the second C components in the second half of the code, at its lower part. In this case, it can be seen that the first C components are the same as the second C components. Also, the S components are divided into the first S components in the first half and the second S components in the second half. In this case, it can be seen that the first S components have symbols opposite to those of the second S components.

Hereinafter a method of generating the resultant LS codes according to embodiments of the invention will be described as follows.

The LS codes with the code length of N ($=2^m$) exist in total N numbers, and the N number of LS codes are expressed as in the following Equation 1 when constructed in a matrix. In this case, m designates a natural number equal or greater than 2 since the code length N should be equal or greater than 4 according to the characteristics of the LS codes.

$$LS^N = \begin{bmatrix} C^N & S^N \\ C^N & -S^N \end{bmatrix} = \begin{bmatrix} LS_0^N \\ \vdots \\ LS_k^N \\ \vdots \\ LS_{N-1}^N \end{bmatrix}, \quad \text{Equation 1}$$

herein, $LS^N$ is a matrix sized of N×N, $C^N$ and $S^N$ are sub-matrices having a size of $$\frac{N}{2} \times \frac{N}{2}.$$

Further, $LS_k^N$ (k is an integer from 0 to N−1) is a row vector having a size of 1×N for designating the kth LS code.

Therefore, the LS code matrix is calculated from $C^N$ and $S^N$, herein, $C^N$ can be recursively obtained via $$C^{\frac{N}{2}}$$

(refer to FIG. 2), which will be described in detail hereinafter.

Meanwhile, a guard component having a value of 0 can be inserted in front or the rear of both $C^N$ and $S^N$. In other words, an LS code having a code length $N(=2^m)+2 \times L_{GUARD}$ can be expressed by the following Equation 2, herein, m is a natural number equal and greater than 2, and $L_{GUARD}$ is an natural number.

$$LS^{N+2 \times L_{GUARD}} = \begin{bmatrix} 0^{L_{GUARD}} & C^N & 0^{L_{GUARD}} & S^N \\ 0^{L_{GUARD}} & C^N & 0^{L_{GUARD}} & -S^N \end{bmatrix} \quad \text{Equation 2}$$

or $$\begin{bmatrix} C^N & 0^{L_{GUARD}} & S^N & 0^{L_{GUARD}} \\ C^N & 0^{L_{GUARD}} & -S^N & 0^{L_{GUARD}} \end{bmatrix} = \begin{bmatrix} LS_0^{N+2 \times l_{GUARD}} \\ \vdots \\ LS_k^{N+2 \times l_{GUARD}} \\ \vdots \\ LS_{N-1}^{N+2 \times l_{GUARD}} \end{bmatrix}.$$

Herein, the $L_{GUARD}$ value means a matrix composed of 0 in the right or left of $C^N$ and in the right or left of $S^N$ so as to produce an IFW. Also, $LS_k^{N+2 \times L_{GUARD}}$ (k is an integer from 0 to N−1) is a row vector sized of 1×(N+2×$L_{GUARD}$) designating the kth LS code, $0^{L_{GUARD}}$ is a zero matrix having a size of $$\frac{N}{2} \times L_{GUARD}$$

and composed of 0. $C^N$ and $S^N$ mean sub-matrices having a size of $$\frac{N}{2} \times \frac{N}{2}.$$

FIG. 2 schematically illustrates an LS and QLS code generating procedure using the initial matrix. Referring to FIG. 2, $LS^N$ and $QLS^N$ can be generated using the initial matrix $C^4$.

First, it will be described about a method of generating $LS^N$ using the initial matrix $C^4$.

As described above, the code length N should be equal and greater than 4 in order to generate the LS codes. Therefore, since N is a natural number equal and greater than 4, $C^4$ is the initial matrix and can be defined as in the following Equation 3:

$$C^4 = \begin{bmatrix} 1 & 1 \\ 1 & -1 \end{bmatrix}. \quad \text{Equation 3}$$

As shown in the foregoing Equation 3, in the initial matrix $C^4$, all elements corresponding to the matrix are 1 except for an element in the second row and second column. As shown in FIG. 2, $$C^{\frac{N}{2}}$$

can be generated from the initial matrix $C^4$, and $C^N$ can be generated from $$C^{\frac{N}{2}}.$$

First of all, $$C^{\frac{N}{2}}$$

is defined as in the following Equation 4:

$$C^{\frac{N}{2}} = \begin{bmatrix} C_1^{\frac{N}{2}} \\ C_2^{\frac{N}{2}} \\ \vdots \\ C_i^{\frac{N}{2}} \\ \vdots \\ C_{\frac{N}{4}}^{\frac{N}{2}} \end{bmatrix},$$

Equation 4 herein, $C_i^{\frac{N}{2}}$ is the ith row vector having a size of $1 \times \frac{N}{4}$, and i is a natural number from 1 to $\frac{N}{4}$.

Therefore, the above $C^{\frac{N}{2}}$ is recursively operated to generate $C^N$, a row vector contained in $C^N$ can be expressed as in the following Equation 5:

$$C_i^N = \begin{cases} \left[ C_{2k+1}^{\frac{N}{2}} \; C_{2k+2}^{\frac{N}{2}} \right], & i = 4k+1 \\ \left[ C_{2k+1}^{\frac{N}{2}} \; -C_{2k+2}^{\frac{N}{2}} \right], & i = 4k+2 \\ \left[ C_{2k+2}^{\frac{N}{2}} \; C_{2k+1}^{\frac{N}{2}} \right], & i = 4k+3 \\ \left[ C_{2k+2}^{\frac{N}{2}} \; -C_{2k+1}^{\frac{N}{2}} \right], & i = 4k+4 \end{cases},$$

Equation 5 herein k is an integer from $0$ to $\frac{N}{8} - 1$, and i is a natural number from $1$ to $\frac{N}{2}$.

As shown in the foregoing Equation 5, it can be understood that $C_i^N$ is generated from the foregoing Equation 4. In other words, k is 0, the row vectors such as $C_1^N$, $C_2^N$, $C_3^N$ and $C_4^N$ can be respectively generated into $$\left[ C_1^{\frac{N}{2}} \; C_2^{\frac{N}{2}} \right], \left[ C_1^{\frac{N}{2}} - C_2^{\frac{N}{2}} \right], \left[ C_2^{\frac{N}{2}} \; C_1^{\frac{N}{2}} \right] \text{ and } \left[ C_2^{\frac{N}{2}} \; C_1^{\frac{N}{2}} \right]$$

according to the foregoing Equation 5. This shows that Equation 5 is generated by respectively using the row vectors of $C^{\frac{N}{2}}$ in Equation 4. Since the foregoing Equation 5 is a row vector of the $C^N$ matrix, all of the remaining row vectors can be generated from the foregoing Equation 5.

Therefore, combining all of the row vectors contained in the $C^N$ matrix generated from the foregoing Equation 5, it can be expressed as in the following Equation 6:

$$C^N = \begin{bmatrix} C_1^N \\ C_2^N \\ C_3^N \\ C_4^N \\ C_5^N \\ C_6^N \\ C_7^N \\ C_8^N \\ \vdots \\ C_{\frac{N}{2}-3}^N \\ C_{\frac{N}{2}-2}^N \\ C_{\frac{N}{2}-1}^N \\ C_{\frac{N}{2}}^N \end{bmatrix} = \begin{bmatrix} C_1^{\frac{N}{2}} & C_2^{\frac{N}{2}} \\ C_1^{\frac{N}{2}} & -C_2^{\frac{N}{2}} \\ C_2^{\frac{N}{2}} & C_1^{\frac{N}{2}} \\ C_2^{\frac{N}{2}} & -C_1^{\frac{N}{2}} \\ C_3^{\frac{N}{2}} & C_4^{\frac{N}{2}} \\ C_3^{\frac{N}{2}} & -C_4^{\frac{N}{2}} \\ C_4^{\frac{N}{2}} & C_3^{\frac{N}{2}} \\ C_4^{\frac{N}{2}} & -C_3^{\frac{N}{2}} \\ \vdots & \vdots \\ C_{\frac{N}{4}-1}^{\frac{N}{2}} & C_{\frac{N}{4}}^{\frac{N}{2}} \\ C_{\frac{N}{4}-1}^{\frac{N}{2}} & -C_{\frac{N}{4}}^{\frac{N}{2}} \\ C_{\frac{N}{4}}^{\frac{N}{2}} & C_{\frac{N}{4}-1}^{\frac{N}{2}} \\ C_{\frac{N}{4}}^{\frac{N}{2}} & -C_{\frac{N}{4}-1}^{\frac{N}{2}} \end{bmatrix}.$$

Equation 6

From Equation 6, it can be seen that $C^N$ is composed of $\frac{N}{2}$ number or row vectors and generated by recursively using the foregoing Equation 5.

Referring to FIG. 2 again, $S^N$ can be generated from $C^N$. Describing it in more detail, $C^N$ and $S^N$ has a relationship that can be expressed as in the following Equations 7 and 8:

$$C^N = \begin{bmatrix} C_1^N \\ C_2^N \\ \vdots \\ C_{\frac{N}{4}-1}^N \\ C_{\frac{N}{4}}^N \\ C_{\frac{N}{4}+1}^N \\ C_{\frac{N}{4}+2}^N \\ \vdots \\ C_{\frac{N}{2}-1}^N \\ C_{\frac{N}{2}}^N \end{bmatrix}, \text{ and} \quad \text{Equation 7}$$

$$S^N = \begin{bmatrix} C_{\frac{N}{4}+1}^N \\ C_{\frac{N}{4}+2}^N \\ \vdots \\ C_{\frac{N}{2}-1}^N \\ C_{\frac{N}{2}}^N \\ C_2^N \\ C_1^N \\ \vdots \\ C_{\frac{N}{4}-1}^N \\ C_{\frac{N}{4}}^N \end{bmatrix}. \quad \text{Equation 8}$$

From the foregoing Equations 7 and 8, it can be seen that $S^N$ is generated from $C^N$. $S^N$ and $C^N$ are symmetric from each other on the basis of the row vectors. In other words, $S^N$ can be generated via cyclic shift of $C^N$ as much as half of the $S^N$ matrix.

An example will be described for more apparent understanding of the foregoing Equations.

Assuming that the code length N is 8, generation of $C^8$ from initial matrix $C^4$ is required to generate an $LS^8$ matrix.

$$C^{\frac{N}{2}}$$

is $C^4$ from Equation 4, and $C^N$ is $C^8$ from Equation 6. $C^4$ is the initial matrix, and thus becomes $$\begin{bmatrix} 1 & 1 \\ 1 & -1 \end{bmatrix}.$$

$C_i^4$ becomes [1 1] using Equation 4 and is defined as the first row. Also, $C_2^4$ becomes [1 −1] and is defined as the second row. Therefore, $C^8$ becomes $$\begin{bmatrix} 1 & 1 & 1 & -1 \\ 1 & 1 & -1 & 1 \\ 1 & -1 & 1 & 1 \\ 1 & -1 & -1 & -1 \end{bmatrix}$$

from Equation 6.

In this case, [1 1 1 −1], [1 1 −1 1], [1 −1 1 1] and [1 −1 −1 −1] are defined as the first to fourth rows of $C^8$.

Then, the first row of $C^8$ can be generated through arranging the first row of $C^4$ in the left and the second row thereof in the right. The second row of $C^8$ can be generated through arranging the first row of $C^4$ in the left and the second row thereof in the right as multiplied with −1. The third row of $C^8$ can be generated through arranging the first row of $C^4$ in the right and the second row thereof in the left. Further, the fourth row of the $C^8$ can be generated through arranging the first row of $C^8$ in the right as multiplied with −1 and arranging the second row thereof in the left.

Meanwhile, $S^8$ can be generated by using Equation 8, and the matrix thereof is $$\begin{bmatrix} 1 & -1 & 1 & 1 \\ 1 & -1 & -1 & -1 \\ 1 & 1 & 1 & -1 \\ 1 & 1 & -1 & 1 \end{bmatrix}.$$

In other words, $S^8$ is composed of four rows of $C^8$ and generated through recursively shifting $C^8$ based upon rows.

Therefore, the LS code matrix $LS^8$ can be generated as follows using Equation 1 based upon $C^8$ and $S^8$:

$$LS^8 = \begin{bmatrix} C^8 & S^8 \\ C^8 & -S^8 \end{bmatrix} = \begin{bmatrix} 1 & 1 & 1 & -1 & 1 & -1 & 1 & 1 \\ 1 & 1 & -1 & 1 & 1 & -1 & -1 & -1 \\ 1 & -1 & 1 & 1 & 1 & 1 & 1 & -1 \\ 1 & -1 & -1 & -1 & 1 & 1 & -1 & 1 \\ 1 & 1 & 1 & -1 & -1 & 1 & -1 & -1 \\ 1 & 1 & -1 & 1 & -1 & 1 & 1 & 1 \\ 1 & -1 & 1 & 1 & -1 & -1 & -1 & 1 \\ 1 & -1 & -1 & -1 & -1 & -1 & 1 & -1 \end{bmatrix}.$$

Note that the guard component can be inserted in $LS^8$ above in order to generate IFW.

Of course, $C^8$ can be extended by multiples without limitations. In other words, it can be understood that $C^8$ can be extended to $C^{16}$, $C^{32}$, $C^{64}$, C128 and the like. Also, generation of $S^{16}$, $S^{32}$, $S^{64}$, $S^{128}$ and the like can be made respectively corresponding to $C^{16}$, $C^{32}$, $C^{64}$, $C^{128}$ and the like, and generation of $LS^{16}$, $LS^{32}$, $LS^{64}$ and $LS^{128}$ can be followed.

Regarding the LS codes generated as above, they have the following characteristics.

First, LS codes with the code length $N(=2^m)+2\times L_{GUARD}$ are N numbered in total. When the N number of LS codes have no time-offset, i.e., the time-offset is zero, the LS codes which are mutually orthogonal are N numbered, herein, m is a natural number equal and greater than 2 and $L_{GUARD}$ is an integer equal and greater than 0.

Second, the LS codes having the foregoing length have an autocorrelation value N where no time-offsets exist, but zero when time-offsets exist in time-offsets $[-L_{GUARD}, L_{GUARD}]$, i.e., the time-offsets are not zero.

Third, a time-offset interval where the LS codes of the foregoing code length have a crosscorrelation value of zero is defined as an IFW.

In this case, in an interval of time-offset=$[-L_{IFW}, L_{IFW}]$ as the IFW interval, the LS codes which are mutually orthogonal are numbered $2^{m-g}$, in which $L_{IFW}$ exists in a range of $2^{g-1} L_{IFW} 2^g$, herein, g is a natural number and $L_{IFW}$ is an integer from 0 to $L_{GUARD}$.

For example, when the code length is $2^m+2 \times L_{GUARD}$, the IFW has the maximum size of time-offset=$[-L_{GUARD}, L_{GUARD}]$, the codes which are mutually orthogonal are numbered $2^{m-g}$. In other words, when the code length is $2^7+2\times 4$, the IFW of the maximum size is $[-4, 4]$, and the codes which are mutually orthogonal are numbered 16 (i.e., $2^4$ is $2^{7-3}$), herein, g is 3 when is the $L_{IFW}=4$ due to $2^{g-1}(=2^{-1}) L_{IFW}(=4) 2^g(=2^3)$.

Referring to FIG. 2 again, $C^{*N}$ and $$S^{\frac{N}{2}}$$

can be generated from $$C^{\frac{N}{2}},$$

$S^{*N}$ can be generated by using $$S^{\frac{N}{2}},$$

and the $QLS^N$ matrix can be generated from each of the resultant $C^{*N}$ and $S^{*N}$.

Hereinafter description will be made about a $QLS^N$ matrix generating method using an Equation.

There exist total N kinds of QLS codes having a code length $N(=2^m)$, and when the N number of QLS codes are composed of a matrix, they are expressed as in the following Equation 9, herein, m is a natural number equal and greater than 3 because the code length N should be equal and greater than 8 according to the QLS code characteristics.

$$QLS^N = \begin{bmatrix} C^{*N} & S^{*N} \\ C^{*N} & -S^{*N} \end{bmatrix} = \begin{bmatrix} QLS_0^N \\ QLS_1^N \\ \vdots \\ QLS_k^N \\ \vdots \\ QLS_{N-2}^N \\ QLS_{N-1}^N \end{bmatrix}. \quad \text{Equation 9}$$

In this case, $QLS^N$ is a matrix sized of N×N, $QLS_k^N$ is a row vector having a size of 1×N for expressing the kth QLS code (herein, k is an integer from 0 to N-1), $C^{*N}$ and $S^{*N}$ are sub-matrices sized of $$\frac{N}{2} \times \frac{N}{2}.$$

It can be understood that the QLS codes are composed of $C^{*N}$ and $S^{*N}$ components.

As shown in FIG. 2, $C^{*N}$ and $$S^{\frac{N}{2}}$$

are generated by using $$C^{\frac{N}{2}},$$

and $S^{*N}$ is generated by using $$S^{\frac{N}{2}}.$$

Then, $QLS^N$ can be generated from the foregoing Equation 9 by using $C^{*N}$ and $S^{*N}$.

Meanwhile, a guard component having a value of 0 can be added to $C^{*N}$ and $S^{*N}$ in the left or right thereof so as to generate an IFW in the each QLS code. In other words, the QLS codes having the code length $N(=2^m)+2 \times L_{GUARD}$ applied with the foregoing guard component can be expressed as in the following Equation 10, herein m is a natural number equal and greater than 3 and $L_{GUARD}$ is an integer equal and greater than 0.

$$QLS^{N+2 \times L_{GUARD}} = \begin{bmatrix} 0^{L_{GUARD}} & C^{*N} & 0^{L_{GUARD}} & S^{*N} \\ 0^{L_{GUARD}} & C^{*N} & 0^{L_{GUARD}} & -S^{*N} \end{bmatrix} \quad \text{Equation 10}$$

or $$\begin{bmatrix} C^{*N} & 0^{L_{GUARD}} & S^{*N} & 0^{L_{GUARD}} \\ C^{*N} & 0^{L_{GUARD}} & -S^{*N} & 0^{L_{GUARD}} \end{bmatrix} =$$

$$\begin{bmatrix} QLS_0^{N+2 \times L_{GUARD}} \\ QLS_1^{N+2 \times L_{GUARD}} \\ \vdots \\ QLS_k^{N+2 \times L_{GUARD}} \\ \vdots \\ QLS_{N-2}^{N+2 \times L_{GUARD}} \\ QLS_{N-1}^{N+2 \times L_{GUARD}} \end{bmatrix}.$$

In this case, the value $L_{GUARD}$ is obtained through inserting a matrix composed of 0 in the left or right of both $C^{*N}$ and $S^{*N}$ for generating the IFW. Also, $QLS_k^{N+2 \times L_{GUARD}}$ is a row vector sized of $1 \times (N+2 \times L_{GUARD})$ for expressing the kth QLS code, herein k is an integer from 0 to N-1, and $0^{L_{GUARD}}$ is a zero matrix composed of 0 with a size of $$\frac{N}{2} \times L_{GUARD}.$$

$C^{*N}$ and $S^{*N}$ mean sub-matrices having a size of $$\frac{N}{2} \times \frac{N}{2}.$$

Hereinafter description will be made about a $C^{*N}$ and $S^{*N}$ generating method. First, describing the $C^{*N}$ matrix generating method, the code length N is equal and greater than 8 as described above.

$$C^{\frac{N}{2}}$$

can be expressed as in the following Equation 11 by using the initial matrix:

$$C^{\frac{N}{2}} = \begin{bmatrix} C^{\frac{N}{2}}_{1,1} & C^{\frac{N}{2}}_{1,2} & & & \\ C^{\frac{N}{2}}_{2,1} & C^{\frac{N}{2}}_{2,2} & & & \\ & & \ddots & & \\ & & & C^{\frac{N}{2}}_{\frac{N}{4}-1,\frac{N}{4}-1} & C^{\frac{N}{2}}_{\frac{N}{4}-1,\frac{N}{4}} \\ & & & C^{\frac{N}{2}}_{\frac{N}{4},\frac{N}{4}-1} & C^{\frac{N}{2}}_{\frac{N}{4},\frac{N}{4}} \end{bmatrix}, \quad \text{Equation 11}$$

herein, $$C^{\frac{N}{2}}_{i,j}$$

designates the element in the ith row and the jth column of the $$C^{\frac{N}{2}}$$

matrix.

$C^{*N}$ can be expressed as in the following Equation 12 based upon the foregoing Equation 11:

$$C^{*N} = \begin{bmatrix} C^{\frac{N}{2}}_{1,1} & C^{\frac{N}{2}}_{1,1} & & & \\ C^{\frac{N}{2}}_{1,1} & -C^{\frac{N}{2}}_{1,1} & & & \\ & & \ddots & & \\ & & & C^{\frac{N}{2}}_{\frac{N}{4},\frac{N}{4}} & C^{\frac{N}{2}}_{\frac{N}{4},\frac{N}{4}} \\ & & & C^{\frac{N}{2}}_{\frac{N}{4},\frac{N}{4}} & -C^{\frac{N}{2}}_{\frac{N}{4},\frac{N}{4}} \end{bmatrix}, \quad \text{Equation 12}$$

herein, $C_{j,k}$ designates the element in the jth row and the kth column.

Then, $$S^{\frac{N}{2}}$$

can be generated by using the foregoing Equations 7 and 8, and expressed as in the following Equation 13:

$$S^{\frac{N}{2}} = \begin{bmatrix} S^{\frac{N}{2}}_{1,1} & S^{\frac{N}{2}}_{1,1} & & & \\ S^{\frac{N}{2}}_{2,1} & -S^{\frac{N}{2}}_{2,2} & & & \\ & & \ddots & & \\ & & & S^{\frac{N}{2}}_{\frac{N}{4}-1,\frac{N}{4}-1} & S^{\frac{N}{2}}_{\frac{N}{4}-1,\frac{N}{4}} \\ & & & S^{\frac{N}{2}}_{\frac{N}{4},\frac{N}{4}-1} & -S^{\frac{N}{2}}_{\frac{N}{4},\frac{N}{4}} \end{bmatrix}. \quad \text{Equation 13}$$

In sequence, $S^{*N}$ can be derived from the foregoing Equation 13 as in the following Equation 14:

$$S^{*N} = \begin{bmatrix} S^{\frac{N}{2}}_{1,1} & S^{\frac{N}{2}}_{1,1} & & & \\ S^{\frac{N}{2}}_{1,1} & -S^{\frac{N}{2}}_{1,1} & & & \\ & & \ddots & & \\ & & & S^{\frac{N}{2}}_{\frac{N}{4},\frac{N}{4}} & S^{\frac{N}{2}}_{\frac{N}{4},\frac{N}{4}} \\ & & & S^{\frac{N}{2}}_{\frac{N}{4},\frac{N}{4}} & -S^{\frac{N}{2}}_{\frac{N}{4},\frac{N}{4}} \end{bmatrix}. \quad \text{Equation 14}$$

Therefore, $QLS^N$ can be generated from the foregoing Equation 9 based upon the foregoing Equations 13 and 14. Of course, using Equation 13 and Equation 14, $C^{*N}$ and $S^{*N}$ can be recursively extended by multiples. This has been already mentioned when describing the LS code generating method, and thus detailed description thereof will be omitted.

Regarding to the QLS codes generated as above, they have the following characteristics.

Description will be made about the characteristics of the QLS codes generated by a relational expression of $C^{*N}$ and $S^{*N}$.

First, there exist total N number of QLS codes having a code length $N(=2^m)+2 \times L_{GUARD}$. When no time-offsets exist in the N number of QLS codes, the QLS codes which are mutually orthogonal are N numbered, herein, m is a natural number equal and greater than 3 and $L_{GUARD}$ is an integer equal and greater than 0.

Second, the autocorrelation value of the QLS codes having the foregoing code length is N where no time-offsets exist, and $$\frac{N}{2} \text{ and } -\frac{N}{2}$$

when the time-offsets are +1 or −1. Also, within the time-offset interval $[-L_{GUARD}, L_{GUARD}]$, the autocorrelation value is 0 in the time-offset which is not 0, +1 or −1.

Third, the time-offset interval where the crosscorrelation value of the QLS codes having the foregoing code length is 0 is defined as an IFW. In this case, the number of the QLS codes which are mutually orthogonal is $2^{m-g-1}$ in the time-offset=$[-L_{IFW}, L_{IFW}]$ interval as the IFW interval. In this case, $L_{IFW}$ should exist in the range of $2^{g-1} L_{IFW} 2^g$, herein g is a natural number and $L_{IFW}$ is an integer in the range of $L_{GUARD} L_{IFW}$ 0.

Meanwhile, in the time-offset=$[-L_{IFW}, L_{IFW}]$ interval which is the IFW interval, when the crosscorrelation value is not 0 in only one pair of codes when the time-offsets are +1 or −1 and satisfies the orthogonality during the remaining time-offsets except for +1 and −1 in the interval of IFW $[-L_{IFW}, L_{IFW}]$, a set of the orthogonal codes satisfying the foregoing characteristics is defined as an effective orthogonal code set, and the IFW satisfying the foregoing characteristics is defined as an effective IEW(EIFW). Then, in the time-offset=$[-L_{IFW}, L_{IFW}]$ interval as the effective IEFW interval, the number of the QLS codes which are effectively orthogonal to one another is $2^{m-g}$. In this case, a condition of $$2^{g-1} \le \left\lfloor \frac{L_{EIFW}}{2} \right\rfloor < 2^g$$

should be satisfied, herein g is a natural number, and $L_{EIFW}$ is an integer in the range of $L_{GUARD}\ L_{EIFW}$ 0. Also, $\lfloor X \rfloor$ means the maximum integer which does not exceed $\lfloor X \rfloor$. Therefore, with regard to the effective IFW, the QLS codes are increased in element number of an effective orthogonal code set compared the LS codes.

Naming the effective orthogonal code set of the QLS codes as Q, the effective orthogonal code set can be expressed as in the following Equation 15:

$$Q=\{QLS_0, QLS_1, \ldots, QLS_{2^{m-g}-2}, QLS_{2^{m-g}-1}\} \quad \text{Equation 15,}$$

herein, g is a natural number in the range of $$2^{g-1} \le \frac{L_{IFW}}{2} < 2^g,$$

and the element number of Q is $2^{m-g}$.

Then, as described before, all codes of the effective orthogonal code set Q respectively have a crosscorrelation value 0 in the time-offset=$[-L_{EIFW}, L_{EIFW}]$ interval. In this case, it has been described already that the crosscorrelation value is not 0 in only one pair of codes when the time-offset is +1 or −1.

In other words, when the time-offset is +1 or −1, the crosscorrelation value is 0 in all codes except for between $QLS_{2 \times k}$ and $QLS_{2 \times k+1}$, herein k is an integer from 0 to $2^{m-g-2}$.

Also, the crosscorrelation values can be 0 in $QLS_{2 \times k}$, $QLS_0, QLS_1, \ldots, QLS_{2 \times k-1}, QLS_{2 \times k+2}, \ldots, QLS_{2^{m-g}-1}$. In the same manner, the crosscorrelation values can be 0 also in $QLS_{2 \times k-1}, QLS_0, QLS_1, \ldots, QLS_{2 \times k-1}, QLS_{2 \times k+2}, \ldots, QLS_{2^{m-g}-1}$.

As described above, when the code length is $N(=2^m)+2 \times L_{GUARD}$, the number of the QLS codes having the crosscorrelation value 0 is $2^{m-g-1}$ in the interval of time-offset=$[-L_{IFW}, L_{IFW}]$ as the IFW interval. In other words, if the IFW interval is $[-L_{IFW}, L_{IFW}]$ in the QLS codes, the element number of the orthogonal code set is $2^{m-g-1}$ in $2^{g-1} L_{IFW} 2^g$.

Further, if the effective IFW is $[-L_{EIFW}, L_{EIFW}]$, the element number of the effective orthogonal code set is $2^{m-g}$ in $$2^{g-1} \le \left\lfloor \frac{L_{EIFW}}{2} \right\rfloor < 2^g.$$

On the contrary, if the IFW is $[-L_{IFW}, L_{IFW}]$ in the LS codes, the element number of the orthogonal code set is $2^{m-g}$ in $2^{g-1} L_{IFW} 2^g$.

Explaining the foregoing description with an example, when the code length is $2^7+2\times 4$, the maximum available IFW is time-offset=$[-4,4]$, and the orthogonal code number of the QLS codes is $8(=2^3=2^{7-3-1})$ since g is 3 with regard to the IFW interval. Also, it can be understood that the effective orthogonal code number is $32(=2^5=2^{7-2})$ since g is 2 with regard to the effective IFW interval. On the contrary, g is 3 in the LS codes while the orthogonal code number is $16(=2^4=2^{7-3})$. As described above, using the QLS codes can increase the effective IFW interval and the element number of the effective orthogonal code set.

The LS codes and the QLS codes generated according to the invention are orthogonal spread codes which can be applied to a CDMA mobile communication system.

Figure 3:
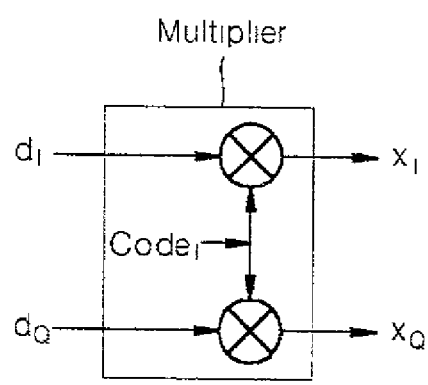
FIG. 3 shows a BPSK spreading process according to the invention.
Figure 4:
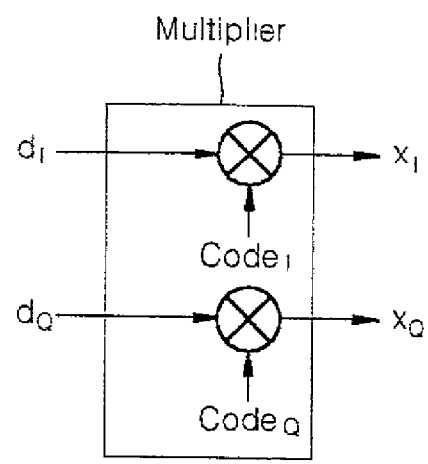
FIG. 4 shows a QPSK spreading process according to the invention.
Figure 5:
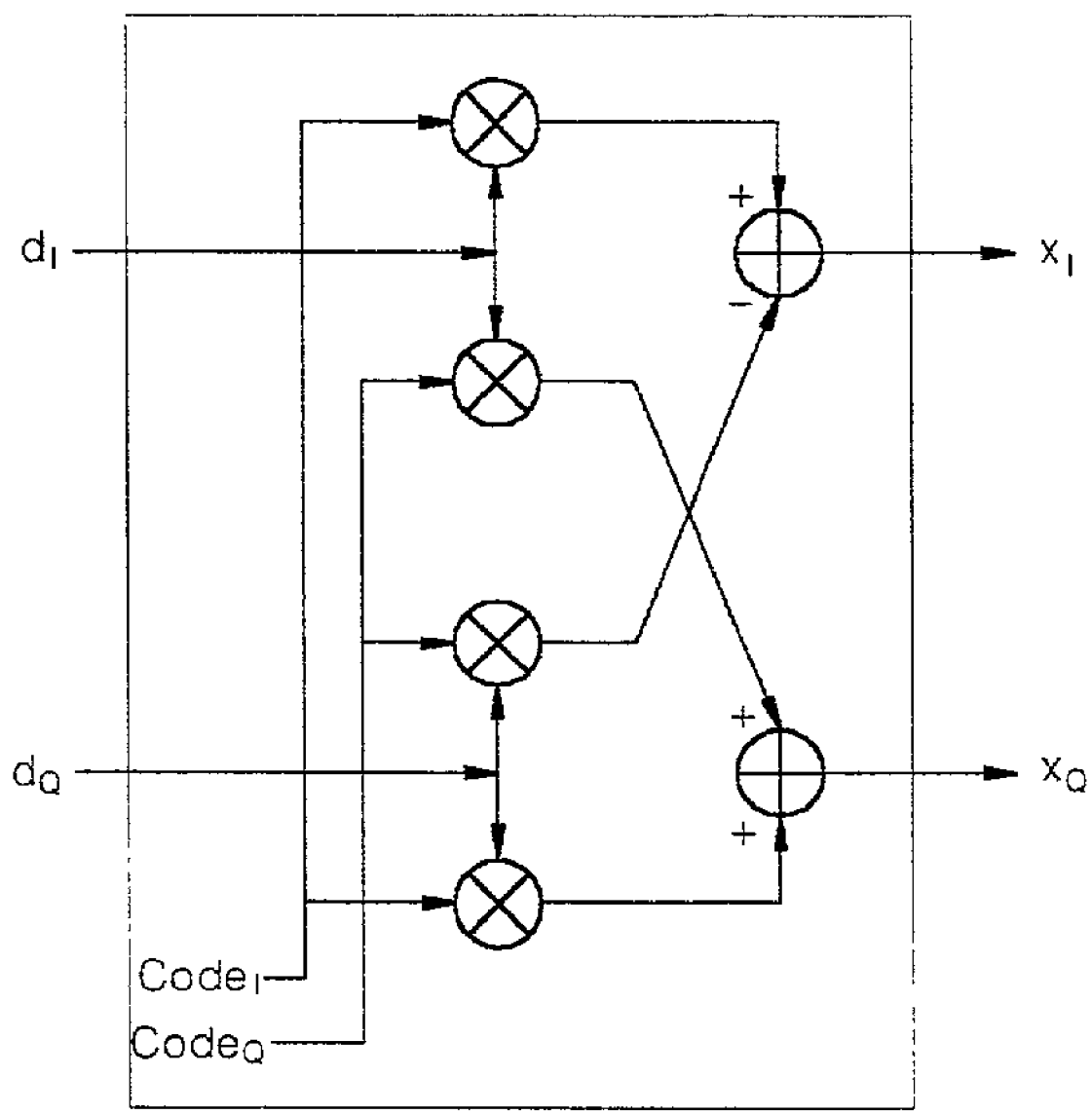
FIG. 5 shows a complex spreading process according to the invention.

In general, spreading methods in use include three types of such as BPSK spreading (refer to FIG. 3), QPSK spreading (refer to FIG. 4) and complex spreading (refer to FIG. 5). The BPSK spreading allocates the same spread code to both In-phase(I) branch and Quadrature-phase(Q) branch, the QPSK spreading and the complex spreading allocate different spread codes to I and Q branch. In this case, the QPSK spreading is different from the complex spreading in a method of multiplying spread codes, which is well known in the art and thus explanation thereof will be omitted.

Figure 6:
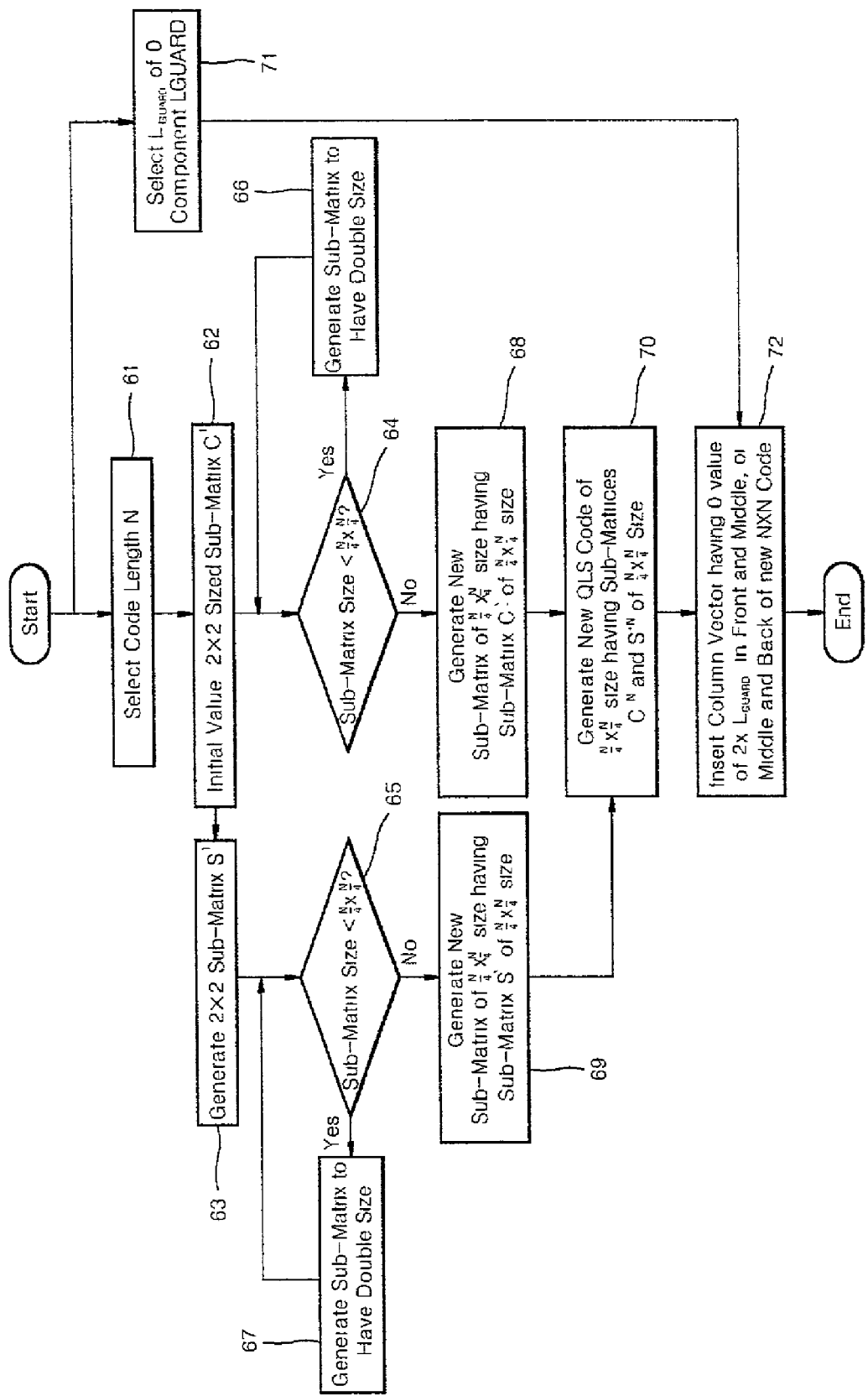
FIG. 6 is a flow chart for illustrating a QLS code generating method for enlarging an effective IFW interval and the element number of an effective orthogonal code set.

FIG. 6 is a flow chart for illustrating a QLS code generating method for increasing the effective IFW interval and the element number of the effective orthogonal code set.

First, a wanted code length other than 0 is selected in step 61. In this case, the code length N has a value $2^m$, herein, m is a natural number equal and greater than 3. It is preferred that the code length is pre-selected.

The initial matrix $C^4$ is generated with a size of 2×2 in step 62, a sub-matrix $S^4$ is generated with a size of 2×2 by using the initial matrix in step 63. In this case, the $S^4$ matrix can be generated by arranging rows of the initial matrix $C^4$ symmetrically.

It is confirmed if the size of the initial matrix C4 is $$\frac{N}{4} \times \frac{N}{4}$$

in step 64, and the initial matrix is extended by multiples until the size of the initial matrix C4 becomes $$\frac{N}{4} \times \frac{N}{4}$$

in step 66. In this case, the initial matrix can be magnified by using the foregoing Equation 11.

If the size of the extended matrix from the initial matrix C4 is $$\frac{N}{4} \times \frac{N}{4},$$

a new sub-matrix $C^{*N}$ is generated by using a matrix corresponding to the size of $$\frac{N}{4} \times \frac{N}{4}$$

in step 68, in which the matrix corresponding to the size of $$\frac{N}{4} \times \frac{N}{4}$$

can be a $$C^{\frac{N}{2}}$$

matrix.

Meanwhile, it is confirmed if the size of a sub-matrix $S^4$ of 2×2 is $$\frac{N}{4} \times \frac{N}{4}$$

in step 65, the sub-matrix $S^4$ is extended by multiples until the size of the sub-matrix $S^4$ of 2×2 becomes $$\frac{N}{4} \times \frac{N}{4}$$

in step 67. In this case, the sub-matrix $S^4$ can be extended by using the foregoing Equation 13.

If the size of the extended matrix of the sub-matrix S4 is $$\frac{N}{4} \times \frac{N}{4},$$

a new sub-matrix $S^{*N}$ can be generated by using the matrix corresponding to the size $$\frac{N}{4} \times \frac{N}{4}$$

in step 69. In this case, the matrix corresponding to the size $$\frac{N}{4} \times \frac{N}{4}$$

can be an $$S^{\frac{N}{2}}$$

matrix.

In step 70, a QLS code matrix is generated based upon $C^{*N}$ and $S^{*N}$ generated from step 68 and step 69, in which the QLS code matrix can be generated by using Equation 9.

If the length $L_{GUARD}$ of the guard component is selected in step 71, the QLS code matrix generated in step 70 is applied with a zero matrix $0^{L_{GUARD}}$ which is as long as the length of the selected guard component in step 71. When the zero matrix $0^{L_{GUARD}}$ of the guard component is applied as in step 71, the IFW interval can be obtained.

As described above, the invention generates the QLS codes which can enhance the system capacity while increasing the effective IFW interval and the element number of the effective orthogonal code set which are free from the influence of performance degradation due to interference.

Also, the QLS codes generated like this can be applied to the BPSK spreading, the QPSK spreading and the complex spreading.

According to the invention as described hereinbefore, it can be understood more apparent and wider about the method of generating the LS codes which are known as only the resultant codes up to the present.

According to the invention, the QLS codes as new orthogonal 'spread codes are .generated for solving the inverse proportional relation between the element number of the orthogonal code set and the IFW interval length which is a disadvantage of the LS codes so that the effective IFW interval and the element number of the effective orthogonal code set can be increased.

According to the invention, the QLS codes can be applied to the BPSK spreading, the QPSK spreading and the complex spreading of the related art so as to avoid channel prediction errors and reduce power imbalance as effects.

While the preferred embodiment of the invention has been described hereinbefore, it can be understood that a number of variations, modifications and substitutions can be made without departing from the principle of the invention. It is apparent that the invention can be applied equivalently by adequately modifying the embodiment. Therefore, the foregoing description may not restrict the scope of the invention which will be defined by the appended claims.

What is claimed is:

1. A method for generating orthogonal spread codes in a mobile communication system, comprising:

generating a first square matrix having a size of powers of 2 by operating an initial 2×2 matrix;

generating a second square matrix of same size of the first square matrix by operating the first square matrix;

composing a third square matrix of double size of the first square matrix, arranging the second square matrix as a first quarter matrix of the third square matrix, wherein the third square matrix is composed by arranging the first square matrix as a second quarter matrix and a third quarter matrix of the thirds square matrix, and arranging the second square matrix as a fourth quarter matrix of the third square matrix by multiplying all elements of the second square matrix by −1;

making a deformed matrix by inserting a zero vector between a column or a row of the third square matrix; and generating orthogonal spread codes for channel discrimination from the rows or columns of the deformed matrix.

2. The method according to claim 1, wherein the first quarter matrix is arranged in the upper right of the third square matrix, the second quarter matrix is arranged in the upper left of the third square matrix, the third quarter matrix is arranged in the lower left of the third square matrix, and the fourth quarter matrix is arranged in the lower right of the third square matrix.

3. The method according to claim 2, wherein said step of making the deformed matrix includes the step of inserting at least one column of zero vector in front or the rear of each of quarter matrices of the third square matrix; and
the generating of orthogonal spread codes is done by taking each of the rows of the deformed matrix as each of the orthogonal spread codes.

4. The method according to claim 2, wherein said step of making the deformed matrix includes the step of inserting at least one row of zero vector over or under each of the quarter matrices of the third square matrix; and
the generating of orthogonal spread codes is done by taking each of the columns of the deformed matrix as each of the orthogonal spread codes.

5. The method according to claim 1, wherein the initial 2×2 matrix is $$\begin{bmatrix} 1 & 1 \\ 1 & -1 \end{bmatrix}.$$

6. The method according to claim 5, wherein the first row of the first 4×4 square matrix is generated by positioning the first row of the initial 2×2 matrix in the two leftmost positions of the first row of the first 4×4 square matrix, and positioning the second row of the initial 2×2 matrix in the two rightmost positions of the first row of the first 4×4 square matrix.

7. The method according to claim 6, wherein the second row of the first 4×4 square matrix is generated by positioning the first row of the initial 2×2 matrix in the two leftmost positions of the second row of the first 4×4 square matrix, and positioning the second row of the initial 2×2 matrix with the opposite symbol applied in the two rightmost positions of the second row of the first 4×4 square matrix.

8. The method according to claim 6, wherein the third row of the first 4×4 square matrix is generated by positioning the first row of the initial 2×2 matrix in the two rightmost positions of the third row of the first 4×4 square matrix, and positioning the second row of the initial 2×2 matrix in the two leftmost positions of the third row of the first 4×4 square matrix.

9. The method according to claim 6, wherein the fourth row of the first 4×4 square matrix is generated by positioning the first row of the initial 2×2 matrix with the opposite symbol applied in the two rightmost positions of the fourth row of the first 4×4 square matrix, and positioning the second row of the initial 2×2 matrix in the two leftmost positions of the fourth row of the first 4×4 square matrix.

10. The method according to claim 1, wherein the second square matrix is generated by circular shifting the rows in the first square matrix as half of the matrix size.

11. A method for generating orthogonal spread codes in a mobile communication system comprising the steps of:
operating an initial square matrix having a size of powers of 2 to generate a first square matrix two times larger than the initial square matrix;
operating the first square matrix to generate a second square matrix;
arranging the second square matrix as a first quarter matrix, arranging the first square matrix as a second quarter matrix and a third quarter matrix, and arranging the second square matrix as a fourth quarter matrix by multiplying all elements thereof with −1 to generate a third square matrix;
inserting a zero vector at least one row or column of the third square matrix to compose a deformed matrix; and
generating orthogonal spread codes for channel discrimination from the rows or columns of the composed matrix.

12. The method according to claim 11, wherein the first quarter matrix is arranged in the upper right of the third square matrix, the second quarter matrix is arranged in the upper left of the third square matrix, the third quarter matrix is arranged in the lower left of the third square matrix, and the fourth quarter matrix is arranged in the lower right of the third square matrix.

13. The method according to claim 12, wherein said step of composing the deformed matrix includes the step of inserting at least one column of zero vector in front or at the rear of each of quarter matrices of the third square matrix, and
wherein said step of generating an orthogonal spread code includes the step of taking each of the rows of the composed matrix as each of the orthogonal spread codes.

14. The method according to claim 12, wherein said step of composing the deformed matrix includes the step of inserting at least one row of zero vector over or under each of the quarter matrices of the third square matrix to compose the deformed matrix; and
wherein said step of generating orthogonal spread codes includes the step of taking each of the columns of the composed matrix as each of the orthogonal spread codes.

15. The method according to claim 11, wherein the initial square matrix having the size of powers of 2 uses a quarter matrix of the third square matrix in the previous step having a size that is half of the third square matrix to be obtained.

16. The method according to claim 15, wherein the first row of the first square matrix, which is two times larger than the initial square matrix, is generated by positioning the first row of the initial square matrix in the leftmost positions, and positioning the second row of the initial square matrix in the rightmost positions of the first row of the first square matrix, which is two times larger than the initial square matrix.

17. The method according to claim 16, wherein the second row of the first square matrix, which is two times larger than the initial square matrix, is generated by positioning the first row of the initial square matrix in the leftmost positions and multiplying the second row of the second row of the initial square matrix by −1, and then positioning it in the rightmost positions of the second row of the first square matrix, which is two times larger than the initial square matrix.

18. The method according to claim 16, wherein the third row of the first square matrix, which is two times larger than the initial square matrix, is generated by positioning the first row of the initial square matrix in the rightmost positions and positioning the second row of the initial square matrix in the leftmost positions of the third row of the first square matrix, which is two times larger than the initial square matrix.

19. The method according to claim 16, wherein the fourth row of the first square matrix, which is two times larger than the initial square matrix, is generated by multiplying the first row of the initial square matrix by −1 and positioning it in the rightmost positions and positioning the second row of the initial square matrix in the leftmost positions of the fourth row of the first square matrix, which is two times larger than the initial square matrix.

20. The method according to claim 19, further comprising the step of arranging the odd rows and the even rows of the initial square matrix as first and second rows to generate each four rows of the first square matrix.

21. The method according to claim 11, wherein the second square matrix is generated by recursively shifting the rows in the first square matrix as half of the matrix size.

22. A method for generating orthogonal spread codes in a mobile communication system, comprising:

operating an initial 2×2 matrix to generate a first square matrix having a size of powers of 2;

operating the first square matrix to generate a second square matrix;

arranging the second square matrix as a first quarter matrix;

arranging the first square matrix as a second quarter matrix and a third quarter matrix;

applying a minus symbol to all elements of the second square matrix to generate a fourth quarter matrix;

composing a third square matrix by taking the first to fourth quarter matrices as quarter matrices of the third square matrix;

inserting zero column vectors among certain columns of the third square matrix to compose a target matrix; and taking rows of the target matrix to generate orthogonal spread codes for channel discrimination.

* * * * *